(12) United States Patent
McKenna et al.

(10) Patent No.: US 7,754,825 B2
(45) Date of Patent: Jul. 13, 2010

(54) LIGHT STABILIZED COPOLYETHERESTER COMPOSITIONS

(75) Inventors: James Michael McKenna, Hockessin, DE (US); Austin H. Reid, Jr., Wilmington, DE (US); Robert R. Reitz, West Chester, DE (US); Shailaja R. Vaidya, Landenberg, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 429 days.

(21) Appl. No.: 11/336,005

(22) Filed: Jan. 20, 2006

(65) Prior Publication Data

US 2006/0173106 A1 Aug. 3, 2006

Related U.S. Application Data

(60) Provisional application No. 60/649,867, filed on Feb. 3, 2005.

(51) Int. Cl.
*C08G 63/181* (2006.01)
(52) U.S. Cl. .................. 525/448; 428/411.1; 428/412; 524/413; 524/434; 524/497; 524/500; 524/539; 524/601; 524/604; 524/605; 524/847; 525/418; 525/419; 525/437; 525/444; 528/272; 528/300; 528/301; 528/308; 528/308.6

(58) Field of Classification Search .................. 525/418; 428/423.7, 411.1; 442/76, 86; 528/272, 528/310
See application file for complete search history.

(56) References Cited

U.S. PATENT DOCUMENTS

| | | | | |
|---|---|---|---|---|
| 5,985,961 A | * | 11/1999 | Dailey et al. | ................. 524/100 |
| 6,362,307 B1 | * | 3/2002 | Mohrschladt et al. | ....... 528/310 |
| 7,144,632 B2 | * | 12/2006 | Hayes | ..................... 428/423.7 |

FOREIGN PATENT DOCUMENTS

| | | |
|---|---|---|
| EP | 885 924 A1 | 12/1998 |
| EP | 1 004 626 | 5/2000 |
| WO | WO98/06575 | 2/1998 |
| WO | WO 00/27914 | 5/2000 |

* cited by examiner

*Primary Examiner*—Vasu Jagannathan
*Assistant Examiner*—R. A. Huhn
(74) *Attorney, Agent, or Firm*—Loretta Smith

(57) ABSTRACT

Ultraviolet light stabilized copolyetherester compositions that comprise at least one nanoparticulate mineral selected from titanium dioxide, cerium oxide, and zinc oxide and at least one organic ultraviolet light stabilizer. Articles formed from the compositions are also disclosed.

20 Claims, No Drawings

LIGHT STABILIZED COPOLYETHERESTER COMPOSITIONS

CROSS REFERENCE TO RELATED APPLICATIONS

This application claims the benefit of priority to U.S. Provisional Application No. 60/649,867, filed Feb. 3, 2005.

FIELD OF THE INVENTION

The present invention relates to ultraviolet light stabilized copolyetherester elastomer compositions comprising at least one nanoparticulate mineral selected from titanium dioxide, cerium oxide, and zinc oxide and one or more organic ultraviolet light stabilizers.

BACKGROUND OF THE INVENTION

As a result of their excellent tear strength, tensile strength, flex life, abrasion resistance, and suitability for a broad range of end-use temperatures, thermoplastic copolyetherester elastomers are used in a broad range of applications, including many automotive applications. However, many of these applications are used outdoors and require that articles made from copolyetheresters be exposed to ultraviolet (UV) radiation during normal use. Copolyetheresters are known to be particularly sensitive to UV radiation (see for example: F. Gugumus in: R. Gächter, H. Müller (ed.).; *Plastics Additives Handbook*, 3$^{rd}$ Ed., Hanser Publishers, Munich 1990, p. 170.) Upon prolonged exposure to UV radiation, even in the presence of typical UV light stabilizers used in thermoplastic resin compositions, copolyetheresters can degrade, leading to a loss of physical properties and a diminished surface appearance. The addition of UV light absorbers such as carbon black can provide compositions that have sufficient stability to UV light for outdoor applications, but the presence of the carbon black means that such compositions are by necessity black or near-black in color. In many applications it would be desirable to be able to use a copolyetherester composition in its natural color or with colorants having a color other than black.

WO 00/27914 discloses a thin packaging film made out of a thermoplastic material with anti-UV properties. The thermoplastic material contains at least one organic anti-UV compound and a at least one inorganic anti-UV compound, where the inorganic compound may be micronized zinc oxide or micronized titanium dioxide.

SUMMARY OF THE INVENTION

There is disclosed and claimed herein a light stabilized copolyetherester composition comprising a melt-mixed blend of (a) about 92 to about 99.8 weight percent of at least one copolyetherester comprising a multiplicity of recurring long chain ester units and short chain ester units joined head-to-tail through ester linkages, said long chain ester units being represented by formula (I):

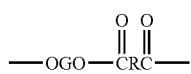

and said short chain ester units being represented by formula (II)

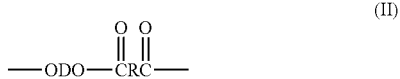

where G is a divalent radical remaining after the removal of terminal hydroxy groups from a poly(alkylene oxide) glycol having a number average molecular weight of about 400 to about 6000; R is a divalent radical remaining after removal of carboxyl groups from a dicarboxylic acid having a molecular weight of less than about 300; and D is a divalent radical remaining after removal of hydroxyl groups from a diol having a molecular weight of less than about 250; wherein said short chain ester units comprise about 15 to about 99 weight percent of the copolyetherester and said long chain ester units comprise about 1 to about 85 weight percent of the copolyetherester;

(b) about 0.1 to about 4 weight percent of at least one nanoparticulate mineral selected from titanium dioxide, cerium oxide, and zinc oxide; and (c) about 0.1 to about 4 weight percent of at least one organic ultraviolet light stabilizer, wherein all weight percentages are based on the total weight of (a)+(b)+(c).

DETAILED DESCRIPTION OF THE INVENTION

The compositions of the present invention comprise at least one thermoplastic copolyetherester elastomer; at least one nanoparticulate mineral selected from titanium dioxide, cerium oxide, and zinc oxide; and one or more organic ultraviolet light stabilizers.

The copolyetheresters used in the present invention are copolymers that have a multiplicity of recurring long-chain ester units and short-chain ester units joined head-to-tail through ester linkages, said long-chain ester units being represented by formula (I):

and said short-chain ester units being represented by formula (II):

wherein

G is a divalent radical remaining after the removal of terminal hydroxyl groups from poly(alkylene oxide)glycols having a number average molecular weight of between about 400 and about 6000, or preferably between about 400 and about 3000;

R is a divalent radical remaining after removal of carboxyl groups from a dicarboxylic acid having a molecular weight of less than about 300;

D is a divalent radical remaining after removal of hydroxyl groups from a diol having a molecular weight less than about 250;

wherein said copolyetherester(s) preferably contain from about 15 to about 99 weight percent short-chain ester units and about 1 to about 85 weight percent long-chain ester units, or wherein the copolyetherester(s) more preferably contain from about 25 to about 90 weight percent short-chain ester units and about 10 to about 75 weight percent long-chain ester units As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly (propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (II) above.

Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol. Included among the bisphenols which can be used are bis(p-hydroxy) diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol). As used herein, the term "diols" includes equivalent ester-forming derivatives such as those mentioned. However, any molecular weight requirements refer to the corresponding diols, not their derivatives.

Dicarboxylic acids that can reacted with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative. Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with the copolyetherester polymer formation and use of the polymer in the compositions of this invention.

The term "aliphatic dicarboxylic acids," as used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—.

Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl) carboxylic acid; and 3,4-furan dicarboxylic acid. Preferred acids are cyclohexane-dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used provided an aromatic dicarboxylic acid is also used.

Aromatic dicarboxylic acids are a preferred class for preparing the copolyetherester polymers useful for this invention. Among the aromatic acids, those with 8-16 carbon atoms are preferred, particularly terephthalic acid alone or with a mixture of phthalic and/or isophthalic acids.

The copolyetheresters preferably comprise about 15 to about 99 weight percent short-chain ester units corresponding to Formula (II) above, the remainder being long-chain ester units corresponding to Formula (I) above. The copolyetheresters more preferably comprise about 20 to about 95 weight percent, and even more preferably about 25 to about 60 weight percent short-chain ester units, where the remainder is long-chain ester units. More preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups that are not 1,4-butylene radicals does not exceed 30%. If a second dicarboxylic acid is used to make the copolyetherester, isophthalic acid is preferred and if a second low molecular weight diol is used, 1,4-butenediol or hexamethylene glycol are preferred.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units.

Preferably, the copolyetherester elastomers are prepared from esters or mixtures of esters of terephthalic acid and isophthalic acid, 1,4-butanediol and poly(tetramethylene ether)glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, e.g. dimethylterephthalate, 1,4-butanediol and poly(tetramethylene ether)glycol.

The copolyetherester elastomers described herein can be made conveniently by methods known to those skilled in the art, such as by using a conventional ester interchange reaction. A preferred procedure involves heating the ester of an aromatic acid, e.g., dimethyl ester of terephthalic acid, with the poly(alkylene oxide)glycol and a molar excess of the low molecular weight diol, 1,4-butanediol, in the presence of a catalyst, followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm pressure and 240-260° C. for less than 2 hours in the presence of antioxidants such as 1,6-bis-(3,5-di-tert-butyl-4-hydroxyphenol)propionamido]-hexane or 1,3,5-trimethyl-2,4,6-tris [3,5-di-tert-butyl-4-hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures, and lithium and magnesium alkoxides are representative of other catalysts that can be used. Also preferred are stannous catalysts.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques (for example, interfacial polymerization of bisphenol with bisacylhalides and bisacylhalide capped linear diols) may be useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method is believed to have the advantage of reducing degradation because it is used at temperatures below the softening point of the prepolymer where the degradation rate is much slower relative to the polymerization rate. The major disadvantage is the long time required to reach a given degree of polymerization.

The copolyetherester elastomer is present in about 92 to about 99.8 weight percent, or preferably in about 96 to about 99.3 weight percent, based on the total amount of copolyetherester elastomer, nanoparticulate mineral, and organic ultraviolet light stabilizer combined.

The nanoparticulate mineral used in the present invention is selected from one or more of titanium dioxide, cerium oxide, and zinc oxide.

The mineral preferably has a number average particle diameter of about 10 to about 175 nanometers or preferably about 30 to about 150 nm, or more preferably about 50 to about 125 nanometers.

The nanoparticulate mineral may also contain ingredients added thereto to improve the durability characteristics or other properties of the mineral. Other ingredients may include hydrous oxides such as silica, alumina, tin oxide, lead oxide, chromium oxides, and the like.

The nanoparticulate mineral, particularly when it is titanium dioxide, may comprise a coating. The titanium dioxide will preferably be coated with an inorganic coating. The mineral-coated titanium dioxide may be further coated with an organic coating that is over the inorganic coating. Preferred inorganic coatings include metal oxides. Organic coatings may include one or more of carboxylic acids, polyols, alkanolamines, and/or silicon compounds.

Examples of carboxylic acids suitable for an organic coating include adipic acid, terephthalic acid, lauric acid, myristic acid, palmitic acid, stearic acid, polyhydroxystearic acid, oleic acid, salicylic acid, malic acid, and maleic acid. By the term "carboxylic acid" is further meant esters and salts of carboxylic acids.

Examples of silicon compounds suitable for an organic coating include, but are not limited to, silicates, organic silanes, and organic siloxanes, including organoalkoxysilanes, aminosilanes, epoxysilanes, mercaptosilanes, and polyhydroxysiloxanes Suitable silanes can have the formula $R_xSi(R')_{4-x}$ wherein R is a nonhydrolyzable aliphatic, cycloaliphatic, or aromatic group having from 1 to about 20 carbon atoms, and R' is one or more hydrolyzable groups such as an alkoxy, halogen, acetoxy, or hydroxy group, and X is 1, 2 or 3.

Useful suitable silanes suitable for an organic coating include one or more of hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl) 3-aminopropylmethyldimethoxysilane, N-(2-aminoethyl) 3-aminopropyltrimethoxysilane, 3-aminopropyltriethoxysilane, 3-glycidoxypropyltrimethoxysilane, 3-glycidoxypropylmethyldimethoxysilane, 3-mercaptopropyltrimethoxysilane and combinations of two or more thereof. In other useful silanes, R has between 8 and 18 carbon atoms, R' is one or more of chloro, methoxy, ethoxy, or hydroxy groups.

When present, the organic coating preferably comprises about 0.1 to about 10 weight percent, or more preferably about 0.5 to about 7 weight percent, or yet more preferably about 0.5 to about 5 weight percent, based on the total weight of the nanoparticulate mineral.

Examples of suitable inorganic coatings include metal oxides and hydrous oxides, including oxides and hydrous oxides of silicon, aluminum, zirconium, phosphorous, zinc, rare earth elements, and the like. A preferred metal oxide is alumina.

The inorganic coating preferably comprises about 0.25 to about 50 weight percent, or more preferably about 1.0 to about 25 weight percent, or yet more preferably about 2 to about 20 weight percent, based on the total weight of the nanoparticulate mineral.

Nanoparticulate titanium dioxide may be prepared by any method known to those skilled in the art. Phosphoric acid, metal phosphates, metal halides, metal carbonates, metal sulfates, and combinations thereof can be used to control the crystallinity, degree of amorphousness, or millability of the nanoparticulate titanium dioxide. Suitable metals for the foregoing include sodium, potassium, aluminum, tin, or zinc.

The nanoparticulate mineral is present in about 0.1 to about 4 weight percent, or preferably in about 0.5 to about 2 weight percent, or more preferably in about 0.5 to about 1 weight percent based on the total weight of the nanoparticulate mineral, copolyetherester elastomer, and organic ultraviolet light stabilizer combined.

The organic UV light stabilizer used in the present invention may be one or more UV light absorbers such as a benzotriazole or a benzophenone light stabilizer. The light stabilizer may also be one or more hindered amine type light stabilizers (HALS). A preferred benzotriazole light stabilizer is Tinuvin® 327, available from Ciba Specialty Chemicals.

Preferred HALS are compounds of the following general formulas and combinations thereof:

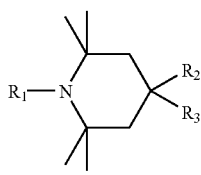 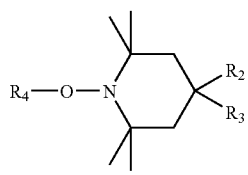

-continued

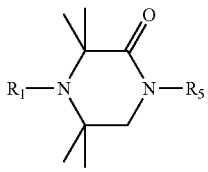 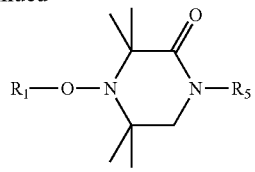

In these formulas, $R_1$ up to and including $R_5$ are independent substituents. Examples of suitable substituents are hydrogen, ether groups, ester groups, amine groups, amide groups, alkyl groups, alkenyl groups, alkynyl groups, aralkyl groups, cycloalkyl groups and aryl groups, in which the substituents in turn may contain functional groups; examples of functional groups are alcohols, ketones, anhydrides, imines, siloxanes, ethers, carboxyl groups, aldehydes, esters, amides, imides, amines, nitriles, ethers, urethanes and any combination thereof. A hindered amine light stabilizer may also form part of a polymer or oligomer.

Preferably, the HALS is a compound derived from a substituted piperidine compound, in particular any compound derived from an alkyl-substituted piperidyl, piperidinyl or piperazinone compound, and substituted alkoxypiperidinyl compounds. Examples of such compounds are: 2,2,6,6-tetramethyl-4-piperidone; 2,2,6,6-tetrametyl-4-piperidinol; bis-(1,2,2,6,6-pentamethyl piperidyl)-(3',5'-di-tert-butyl-4'-hydroxybenzyl) butylmalonate; di-(2,2,6,6-tetramethyl-4-piperidyl) sebacate (Tinuvin® 770); oligomer of N-(2-hydroxyethyl)-2,2,6,6-tetramethyl-4-piperidinol and succinic acid (Tinuvin® 622); oligomer of cyanuric acid and N,N-di (2,2,6,6-tetramethyl-4-piperidyl)-hexamethylene diamine; bis-(2,2,6,6-tetramethyl-4-piperidinyl) succinate; bis-(1-octyloxy-2,2,6,6-tetramethyl-4-piperidinyl) sebacate (Tinuvin® 123); bis-(1,2,2,6,6-pentamethyl-4-piperidinyl) sebacate (Tinuvin® 765); Tinuvin® 144; Tinuvin® XT850; tetrakis-(2,2,6,6-tetramethyl-4-piperidyl)-1,2,3,4-butane tetracarboxylate; N,N'-bis-(2,2,6,6-tetramethyl-4-piperidyl)-hexane-1,6-diamine (Chimasorb® T5); N-butyl-2,2,6,6-tetramethyl-4-piperidinamine; 2,2'-[(2,2,6,6-tetramethyl-piperidinyl)-imino]-bis-[ethanol]; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346); 5-(2,2,6,6-tetramethyl-4-piperidinyl)-2-cyclo-undecyl-oxazole) (Hostavin® N20); 1,1'-(1,2-ethane-di-yl)-bis-(3,3',5,5'-tetramethyl-piperazinone); 8-acetyl-3-dothecyl-7,7,9,9-tetramethyl-1,3,8-triazaspiro(4,5)decane-2,4-dione; polymethylpropyl-3-oxy-[4(2,2,6,6-tetramethyl)-piperidinyl]siloxane (Uvasil® 299); 1,2,3,4-butane-tetracarboxylic acid-1,2,3-tris(1,2,2,6,6-pentamethyl-4-piperidinyl)-4-tridecylester; copolymer of alpha-methylstyrene-N-(2,2,6,6-tetramethyl-4-piperidinyl) maleimide and N-stearyl maleimide; 1,2,3,4-butanetetracarboxylic acid, polymer with beta,beta,beta',beta'-tetramethyl-2,4,8,10-tetraoxaspiro[5.5]undecane-3,9-diethanol, 1,2,2,6,6-pentamethyl-4-piperidinyl ester (Mark® LA63); 2,4,8,10-tetraoxaspiro[5.5]undecane-3,9-diethanol,beta,beta,beta',beta'-tetramethyl-polymer with 1,2,3,4-butanetetracarboxylic acid, 2,2,6,6-tetramethyl-4-piperidinyl ester (Mark® LA68); D-glucitol, 1,3:2,4-bis-O-(2,2,6,6-tetramethyl-4-piperidinylidene)-(HALS 7); oligomer of 7-oxa-3,20-diazadispiro[5.1.11.2]-heneicosan-21-one-2,2,4,4-tetramethyl-20-(oxiranylmethyl) (Hostavin® N30); propanedioic acid, [(4-methoxyphenyl)methylene]-, bis(1,2,2,6,6-pentamethyl-4-piperidinyl) ester (Sanduvor® PR 31); formamide, N,N'-1,6-hexanediylbis[N-(2,2,6,6-tetramethyl-4-piperidinyl (Uvinul® 4050H); 1,3,5-triazine-2,4, 6-triamine, N,N'''-[1,2-ethanediylbis [[[4,6-bis[butyl(1,2,2, 6,6-pentamethyl-4-piperidinyl)amino]-1,3,5-triazine-2-yl] imino]-3,1-propanediyl]]-bis[N',N''-dibutyl-N',N''-bis(1,2,2, 6,6-pentamethyl-4-piperidinyl) (Chimassorb® 119); poly [[6-[(1,1,3,33-tetramethylbutyl) amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]] (Chimassorb® 944); 1,5-dioxaspiro (5,5) undecane 3,3-dicarboxylic acid, bis(2,2,6,6-tetramethyl-4-peridinyl) ester (Cyasorb® UV-500); 1,5-dioxaspiro (5,5) undecane 3,3-dicarboxylic acid, bis (1,2,2,6,6-pentamethyl-4-peridinyl) ester (Cyasorb® UV-516); N-2,2,6,6-tetramethyl-4-piperidinyl-N-amino-oxamide; 4-acryloyloxy-1,2,2,6,6-pentamethyl-4-piperidine. 1,5,8,12-tetrakis[2',4'-bis(1",2",2",6",6"-pentamethyl-4"-piperidinyl(butyl)amino)-1',3',5'-triazine-6'-yl]-1,5, 8,12-tetraazadodecane; HALS PB-41 (Clariant Huningue S. A.); Nylostab® S-EED (Clariant Huningue S. A.); 3-dodecyl-1-(2,2,6,6-tetramethyl-4-piperidyl)-pyrrolidin-2,5-dione; Uvasorb® HA88; 1,1'-(1,2-ethane-di-yl)-bis-(3,3',5,5'-tetramethyl-piperazinone) (Good-rite® 3034); 1,1'1"-(1,3,5-triazine-2,4,6-triyltris ((cyclohexylimino)-2,1-ethanediyl)tris (3,3,5,5-tetramethylpiperazinone) (Good-rite® 3150) and; 1,1',1"-(1,3,5-triazine-2,4,6-triyltris((cyclohexylimino)-2,1-ethanediyl)tris(3,3,4,5,5-tetramethylpiperazinone) (Good-rite® 3159). (Tinuvin® and Chimassorb® materials are available from Ciba Specialty Chemicals; Cyasorb® materials are available from Cytec Technology Corp.; Uvasil® materials are available from Great Lakes Chemical Corp.; Saduvor®, Hostavin®, and Nylostab® materials are available from Clariant Corp.; Uvinul® materials are available from BASF; Uvasorb® materials are available from Partecipazioni Industriali; and Good-rite® materials are available from B.F. Goodrich Co. Mark® materials are available from Asahi Denka Co.)

Preferred HALS include high-molecular weight oligomeric or polymeric HALS. having a molecular weight of more than about 1000, and preferably more than about 2000. Examples of commercial oligomeric HALS include Tinuvin® 622, Uvasil® 299, Cyasorb® UV 3346, Cyasorb® UV 3529 and Chimassorb® 944.

The organic light stabilizer is present in about 0.1 to about 4 weight percent, or preferably in about 0.2 to about 2 weight percent, or more preferably in about 0.3 to about 1 weight percent based on the total weight of the organic ultraviolet light stabilizer, copolyetherester elastomer, and nanoparticulate mineral combined.

The composition of the present invention may further comprise additional additives such as colorants, antioxidants, heat stabilizers, lubricants, fillers and reinforcing agents, viscosity modifiers, nucleating agents, plasticizers, mold release agents, flame retardants, scratch and mar modifiers, and impact modifiers. When used, additional additions are preferably present in about 0.1 to about 10 weight percent, based on the total weight of the composition. A preferred additive is carbon black. When used, carbon black is preferably present in about 0.1 to about 4 weight percent, or more preferably in about 0.25 to about 3.5 weight percent, or yet more preferably in about 0.5 to about 3 weight percent, based on the total weight of the composition.

The compositions of the present invention are melt-mixed blends, wherein all of the polymeric components are well-dispersed within each other and all of the non-polymeric ingredients are homogeneously dispersed in and bound by the polymer matrix, such that the blend forms a unified whole. Any melt-mixing method may be used to combine the polymeric components and non-polymeric ingredients of the present invention. The nanoparticulate mineral is preferably added to the components as a masterbatch in a polymer such as a copolyetherester.

For example, the polymeric components and non-polymeric ingredients may be added to a melt mixer, such as, for example, a single or twin-screw extruder; a blender; a kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The composition of the present invention may be formed into articles using methods known to those skilled in the art, such as, for example, injection molding, blow molding, extrusion, thermoforming, melt casting, rotational molding, and slush molding. The composition may be overmolded onto an article made from a different material. The composition may be extruded into films. The composition may be formed into monofilaments.

Articles comprising the composition of the present invention can include air bag doors, automotive dashboard components and other molded automotive interior parts, tubing, furniture components such as office furniture, indoor furniture, and outdoor furniture, footwear components, roof liners, outdoor apparel, water management system components, and cable and wire jacketing. A preferred article is an a vehicle dashboard slush molded from the composition of the present invention.

EXAMPLES

The components in Table 1 were first dry blended and then melt blended in a twin screw extruder operating with barrel temperatures set at about 220-235° C. The melt temperature was about 225° C. Prior to use in preparation of the Example 1 and Comparative Examples 1-3, the nanoparticulate titanium dioxide was formed into a masterbatch by blending it with Hytrel® 4556 in a Brabender mixer, such that the masterbatch contained 20 weight percent titanium dioxide and 80 percent Hytrel® 4556.

In Table 1, "copolyetherester elastomer" refers to Hytrel® 4556, a copolyetherester elastomer supplied by E.I. du Pont de Neumours & Co., Wilmington Del.; "nanoparticulate titanium dioxide" refers to RM 130F, supplied by Sachtleben Chemie, Duisburg, Germany; and "organic UV light stabilizer" refers to a 50/50 by weight mixture of Chimassorb® 944 and Tinuvin® 770, which are both hindered amine light stabilizers supplied by Ciba Specialty Chemicals Corp, Tarrytown, N.Y.

The compositions of Example 1 and Comparative Examples 1-3 were formed into films of about 4-7 mils in thickness in a press operating at about 225° C. and about 3000 psi. The films were cut into microtensile ASTM D638 type V dumbbells.

Tensile strength at break and elongation at break of the microtensile dumbbells were measured using ASTM D638. The specimens were subjected to ultraviolet light in a QUV accelerated weathering tester equipped with UVA 340 bulbs and supplied by Q-Panel lab products. Samples were periodically removed and their elongation at break properties are shown in Table 2 and tensile strength at break properties are shown in Table 3. Measurements were done with a 2 in/minute pull speed. The number of days exposure for each sample is indicated in the Tables. The percentage retention of physical properties based on the pre-exposure measurements (indicated as "0 days" in Tables 2 and 3) were calculated and are given in Tables 2 and 3. When the samples had deteriorated to a point at which it was not possible to measure their physical properties, this is indicated in the Tables as "n/m", not measured.

Comparative Example 1 shows that a sample of copolyetherester elastomer containing no stabilizers shows a rapid deterioration of its physical properties upon exposure to UV light. Comparative Example 2 shows that a copolyetherester composition containing nanoparticulate titanium dioxide similarly shows a rapid deterioration of its physical properties. Comparative Example 3 shows that a copolyetherester composition containing organic UV stabilizers has a less rapid, but still significant deterioration in its physical properties. Example 1 shows that a copolyetherester composition containing both organic UV stabilizers and nanoparticulate titanium dioxide has excellent retention of its physical properties, even after exposure to UV light for 100 days.

TABLE 1

|  | Example 1 | Comp. Ex. 1 | Comp. Ex. 2 | Comp. Ex. 3 |
|---|---|---|---|---|
| Copolyetherester elastomer | 97.4 | 100 | 98 | 99.4 |
| Nanoparticulate titanium dioxide | 2 | — | 2 | — |
| Organic UV light stabilizer | 0.6 | — | — | 0.6 |

Ingredient quantities are given in weight percentages

TABLE 2

|  | 0 days | 14 days | | 28 days | | 35 days | | 42 days | | 49 days | | 56 days | | 100 days | |
|---|---|---|---|---|---|---|---|---|---|---|---|---|---|---|---|
|  | EB (%) | EB (%) | % reten. | EB (%) | % reten. | EB (%) | % reten. | EB (%) | % reten. | EB (%) | % reten. | EB (%) | % reten. | EB (%) | % reten. |
| Example 1 | 836 | 793 | 95 | 826 | 99 | 813 | 97 | 786 | 94 | 792 | 95 | 850 | 102 | 803 | 96 |
| Comp. Ex. 1 | 764 | 591 | 77 | n/m | n/m | n/m | n/m | n/m | n/m | n/m | n/m | n/m | n/m | n/m | n/m |
| Comp. Ex. 2 | 782 | 807 | 106 | 476 | 62 | 60 | 8 | 12 | 2 | 6 | 1 | n/m | n/m | n/m | n/m |
| Comp. Ex. 3 | 756 | 575 | 75 | 361 | 47 | 295 | 39 | 284 | 37 | 326 | 43 | 280 | 37 | n/m | n/m |

"EB" refers to elongation at break.

"% reten." refers the percentage retention of the initial (0 days) elongation at break experienced by the sample after UV light radiation for the given time.

"n/m" means not measured.

TABLE 3

|  | 0 days | 14 days | | 28 days | | 35 days | | 42 days | | 49 days | | 56 days | | 100 days | |
|---|---|---|---|---|---|---|---|---|---|---|---|---|---|---|---|
|  | TS (kpsi) | TS (kpsi) | % reten. | TS (kpsi) | % reten. | TS (kpsi) | % reten. | TS (kpsi) | % reten. | TS (kpsi) | % reten. | TS (kpsi) | % reten. | TS (kpsi) | % reten. |
| Example 1 | 3.43 | 3.31 | 97 | 3.19 | 93 | 2.99 | 87 | 3.06 | 89 | 3.10 | 90 | 3.27 | 96 | 3.18 | 92.8 |
| Comp. Ex. 1 | 3.45 | 3.18 | 92 | 1.43 | 42 | n/m | n/m | n/m | n/m | n/m | n/m | n/m | n/m | n/m | n/m |
| Comp. Ex. 2 | 3.43 | 2.89 | 84 | 1.02 | 30 | 0.33 | 10 | 0.17 | 5 | 0.08 | 2 | n/m | n/m | n/m | n/m |
| Comp. Ex. 3 | 3.41 | 2.52 | 74 | 1.55 | 46 | 1.38 | 40 | 1.99 | 58 | 1.87 | 55 | 1.82 | 53 | n/m | n/m |

"TS" refers to tensile strength at break.

"% reten." refers the percentage retention of the initial (0 days) tensile strength at break experienced by the sample after UV light radiation for the given time.

"n/m" means not measured.

The invention claimed is:

1. A light stabilized copolyetherester composition comprising a melt-mixed blend of:
   (a) about 94 to about 99.8 weight percent of at least one copolyetherester comprising a multiplicity of recurring long chain ester units and short chain ester units joined head-to-tail through ester linkages, said long chain ester units being represented by formula (I):

   (I)

and said short chain ester units being represented by formula (II):

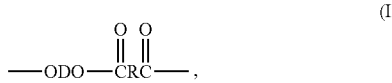
   (II)

wherein G is a divalent radical remaining after the removal of terminal hydroxy groups from a poly (alkylene oxide) glycol having a number average molecular weight of about 400 to about 6000;
   D is a divalent radical remaining after removal of hydroxyl groups from a diol having a molecular weight of less than about 250; and
   R is a divalent radical remaining after removal of carboxyl groups from a dicarboxylic acid having a molecular weight of less than about 300;
   wherein said short chain ester units comprise about 15 to about 99 weight percent of the copolyetherester and said long chain ester units comprise about 1 to about 85 weight percent of the copolyetherester;
   (b) about 0.1 to about 4 weight percent of at least one nanoparticulate mineral selected from titanium dioxide, cerium oxide, and zinc oxide; and
   (c) about 0.1 to about 2 weight percent of at least one organic ultraviolet light stabilizer, which is at least one hindered amine light stabilizer, wherein all weight percentages are based on the total weight of (a)+(b)+(c), and provided that the composition does not contain carbon black.

2. The composition of claim 1, wherein:
   (a) the poly(alkylene oxide) glycol is poly(tetramethylene oxide) glycol;
   (b) the dicarboxylic acid is isophthalic acid, terephthalic acid, phthalic acid, or mixtures thereof; and
   (c) the diol is 1,4-butanediol.

3. The composition of claim 1, wherein the nanoparticulate mineral is titanium dioxide.

4. The composition of claim 1, wherein the nanoparticulate mineral is cerium oxide.

5. The composition of claim 1, wherein the nanoparticulate mineral is zinc oxide.

6. The composition of claim 1, wherein the nanoparticulate mineral has a number average particle diameter of about 10 to about 175 nanometers.

7. The composition of claim 1, wherein the nanoparticulate mineral has a number average particle diameter of about 50 to about 125 nanometers.

8. The composition of claim 3, wherein the titanium dioxide is coated with an inorganic coating.

9. The composition of claim 8, wherein the titanium dioxide is further coated with an organic coating.

10. The composition of claim 9, wherein the organic coating comprises at least one organic silicon compound.

11. The composition of claim 9, wherein the coating comprises at least one carboxylic acid.

12. The composition of claim 9, wherein the coating is one or more of octyltriethoxysilane, aminopropyltriethoxysilane, polyhydroxystearic acid, or polyhydroxysiloxanes.

13. The composition of claim 8, wherein the inorganic coating is at least one oxide or hydrous oxide of silicon, aluminum, zirconium, phosphorous, zinc, and/or a rare earth element.

14. The composition of claim 13, wherein the inorganic coating is alumina.

15. A molded article formed from the composition of claim 1.

16. An article formed from the composition of claim 1 by slush molding.

17. The article of claim 15 in the form of a vehicle dashboard.

18. The article of claim 15 in the form of an airbag door.

19. A monofilament formed from the composition of claim 1.

20. An extruded film formed from the composition of claim 1.

* * * * *